United States Patent
Ikeda et al.

(10) Patent No.: US 7,812,831 B2
(45) Date of Patent: Oct. 12, 2010

(54) INPUT AND OUTPUT DEVICE AND TERMINAL DEVICE

(75) Inventors: Naoyasu Ikeda, Tokyo (JP); Shin-ichi Uehara, Tokyo (JP); Nobuaki Takanashi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 805 days.

(21) Appl. No.: 11/154,734

(22) Filed: Jun. 17, 2005

(65) Prior Publication Data

US 2005/0280637 A1 Dec. 22, 2005

(30) Foreign Application Priority Data

Jun. 18, 2004 (JP) .............................. 2004-181863

(51) Int. Cl.
*G06F 3/042* (2006.01)
(52) U.S. Cl. ....................................... 345/175; 345/178
(58) Field of Classification Search ..................... 345/6, 345/156, 173–179, 7, 104; 359/462; 178/18.01
See application file for complete search history.

(56) References Cited

U.S. PATENT DOCUMENTS

| 4,945,348 A | 7/1990 | Ibamoto et al. | |
|---|---|---|---|
| 6,040,807 A * | 3/2000 | Hamagishi et al. | 345/6 |
| 6,603,442 B1 * | 8/2003 | Hong | 345/7 |
| 7,268,747 B2 * | 9/2007 | Taniguchi et al. | 345/6 |
| 2003/0016444 A1 * | 1/2003 | Brown et al. | 359/462 |
| 2003/0025677 A1 * | 2/2003 | Iwamoto et al. | 345/173 |
| 2003/0161040 A1 * | 8/2003 | Ishii et al. | 359/462 |
| 2004/0041747 A1 * | 3/2004 | Uehara et al. | 345/6 |

FOREIGN PATENT DOCUMENTS

| CN | 1160258 A | 9/1997 |
|---|---|---|
| JP | H04-114224 A | 4/1992 |
| JP | 06-051906 A | 2/1994 |
| JP | 10105735 A * | 4/1998 |
| JP | H10-283114 A | 10/1998 |
| JP | 2004-085924 A | 3/2004 |

* cited by examiner

*Primary Examiner*—Chanh Nguyen
*Assistant Examiner*—Adam J Snyder
(74) *Attorney, Agent, or Firm*—Sughrue Mion, PLLC

(57) ABSTRACT

A lenticular lens is provided in front of a liquid crystal panel composed of a plurality of pixels. In this case, the lenticular lens is arranged so that one cylindrical lens corresponds to two pixels adjacent to each other. Then, light rays outgoing from two pixels are refracted by this one cylindrical lens and intersect with each other at a point positioned on the surface of a tablet, and then reach the right eye and the left eye of a user, respectively.

13 Claims, 13 Drawing Sheets

INPUT AND OUTPUT DEVICE AND TERMINAL DEVICE

BACKGROUND OF THE INVENTION

1. Field of the Invention

The present invention relates to an input and output device which includes a flat input unit mounted on a display unit, and inputs while displaying characters and figures inputted by handwriting into the flat input unit in real time, and a terminal device using this. Particularly, the present invention can be preferably applicable to input and output devices which are equipped with terminal devices such as cell phones, mobile terminals, PDAs (personal digital assistances), game machines, digital cameras, digital video cameras, and personal computers, and can input data with sensation of handwriting, and terminal devices including the input and output devices.

2. Description of the Related Art

As means for inputting data into a computer, keyboards are generally known. However, at present, data to be inputted into computers is not only text data composed of arrangement of the alphabet and numerals assigned to a keyboard, but also data to be inputted in a way like handwriting of characters and figures on a paper with a pen. As means for inputting information while looking at a display screen, a mouse, tablets, and touch panels have already been made practicable. However, among these, a mouse is used by users for input operation from positions apart from the display screen, so that the sensation like drawing characters and figures with a pen cannot be obtained.

On the other hand, in the case of an input and output device having a tablet and a touch panel (hereinafter, called a tablet as a general term of these) overlapped on a flat panel display such as a liquid crystal display (hereinafter, referred to as LCD also), a user can input information only by bringing the tip end of an input pen or his/her fingertip close to the display screen, and the inputted data is displayed on the flat display panel in real time. Therefore, by using such an input and output device, the sensation like handwriting of characters and figures on a paper with a pen is obtained, so that this device is used for supporting users to input data into computers.

FIG. 1 is a sectional view showing a conventional input and output device. As shown in FIG. 1, this conventional input and output device includes an LCD 51, a tablet 52 overlapped on this LCD 51, and a pen 53 for inputting data into this tablet 52. In the LCD 51 a TFT substrate 48 on which, for example, data bus lines, gate bus lines, pixel electrodes and thin film transistors (hereinafter, referred to as TFT) are formed and a color filter substrate 49 on which transparent electrodes made of ITO (indium tin oxide) and color filters are formed are provided in parallel to each other, and between the TFT substrate 48 and the color filter substrate 49, a liquid crystal layer 50 is disposed. For example, the TFT substrate 48 and the color filter 49 are glass substrates with thicknesses of approximately 0.5 mm, and in the tablet 52, a film with transparent electrodes made of ITO or the like is laminated and fixed to a supporting substrate, and the thickness of this supporting substrate is approximately 1 mm.

However, the above-described conventional technique has the following problem. As shown in FIG. 1, it is assumed that the tip end of the pen 53 is made contact with the point A of the tablet 52 for inputting image data by a user. In this case, the tablet 52 detects the contact of the pen 53 and outputs the contact position data to the LCD 51, and based on this position data, the LCD 51 displays at the point B corresponding to the position. At this point, as shown in FIG. 1, the point A and the point B are at a distance corresponding to the total thickness of the tablet 52 and the color filter substrate 49 of the LCD 51 from each other. For example, in the case of this input and output device, the thickness of the tablet 52 is 1 mm, the thickness of the color filter substrate 49 of the LCD 51 is 0.5 mm, so that the point A and the point B are at a 1.5 mm distance in total from each other. Therefore, when a user looks at these points, the image looks deep and the user has a sense of discomfort. Due to this "depth feel," the input operation of the user loses accuracy, and the operation efficiency significantly lowers and makes the user tired.

In order to solve this problem, the following method has been proposed. For example, Japanese Patent Publication No. H4-114224 discloses a technique for reducing the depth feel by using optical fibers. FIG. 2 is a perspective view showing the conventional input and output device disclosed in Japanese Patent Publication No. H4-114224, and FIG. 3 is a schematic sectional view of the identical. As shown in FIG. 2 and FIG. 3, in this conventional input and output device, an illumination back light 58 is provided, and in front of this back light 58, a flat display 57 is disposed. The flat display 57 is a liquid crystal display, wherein two substrates are disposed in parallel to each other, and between these, a liquid crystal layer (not shown) is disposed. In addition, in front of the flat display 57, a parallax correcting plate 56 formed by bundling optical fibers into a plate shape is provided, and in front of the parallax correcting plate 56, a tablet 55 is provided. The tablet 55 detects a contact position of a pen 54 when the pen 54 comes into contact with it. In FIG. 3, a path 59 of light emitted from the back light 58 is shown.

As shown in FIG. 3, the substrate thickness on the user side of the flat display 57 is defined as d1, and the thickness of the tablet 55 is defined as d2. If no parallax correcting plate 56 is provided, the display position on the flat display 57 viewed from a user is the point C positioned on the liquid crystal layer. Therefore, when the pen 54 is made contact with the tablet 55, there is a distance of (d1+d2) between the contact point E of the pen 54 on the surface of the tablet 55 and the display point C on the flat display 57. On the other hand, when the parallax correcting plate 56 is inserted between the flat display 57 and the tablet 55, light that has been emitted from the back light 58 and transmitted through the display 57 is transmitted along the path 59 in the optical fibers of the parallax correcting plate 56, and is imaged at the point D. Thereby, the distance between the display position (point D) and the input position (point E) becomes d2, whereby the depth feel can be reduced in comparison with the case where no parallax correcting plate 56 is provided.

In addition, for example, Japanese Patent Publication No. H10-283114 discloses a technique for forming an image on the surface of an input and output device by using a micro lens and a light diffusion layer. FIG. 4 is a schematic sectional view showing the conventional input and output device disclosed in Japanese Patent Publication No. H10-283114. As shown in FIG. 4, in this input and output device, an electromagnetic exchange type sensor substrate 63 is provided, and in front of this sensor substrate 63, a back light 64, a liquid crystal display unit 65, a micro lens array sheet 69, and a light diffusion layer 70 are provided in this order. In the liquid crystal display unit 65, a liquid crystal layer 68 is disposed between an upper substrate 66 and a lower substrate 67. In addition, in the micro lens array sheet 69, a number of lenses are formed on the upper substrate 66 side. Furthermore, the light diffusion layer 70 diffuses light converged by the micro lens array sheet 69. The sensor substrate 63 detects the position of the tip end of the pen 71 by means of the electromagnetic exchange method.

When the micro lens array sheet 69 and the light diffusion layer 70 are not provided, light transmitted through the point A of the liquid crystal display unit 65 appears to have exited from the point A. Therefore, even when the user tries to make the tip end of the pen 71 contact with the point A from above, the point A and the tip end of the pen 71 deviate from each other at a distance corresponding to the thickness of the upper substrate 66. On the other hand, by providing the micro lens array sheet 69 and the light diffusion layer 70, light that has exited from the point A is converged to the light diffusion layer 70 by lenses formed on the micro lens array sheet 69, and imaged at the point B on the light diffusion layer 70. Thereby, when a user looks at this, the image appears to be displayed at the point on the light diffusion layer 70, whereby the depth feel due to the thickness of the upper substrate 66 can be reduced.

However, the conventional technique has the following problem. With the technique described in Japanese Patent Publication No. H4-114224 shown in FIG. 2 and FIG. 3, the depth feel due to the thickness d2 of the tablet 55 cannot be corrected even by using the parallax correcting plate 56. In addition, since the parallax correcting plate 56 is manufactured by bundling and binding the optical fibers with a resin, it is difficult to manufacture a large-size parallax correcting plate. Furthermore, the number of optical fibers to be bundled increases in proportion to the area, and therefore, to manufacture a plate with a comparatively large area such as a monitor for a cell phone, a PDA, or a monitor of a personal computer, a large number of fibers must be bundled, and the costs are extremely high.

In addition, the technique described in Japanese Patent Publication No. H10-283114 shown in FIG. 4 employs a method in which an image is formed on the surface of the input and output device by using lenses, so that light must be scattered on the surface of the input and output device by the light diffusion layer 70. However, the light diffusion layer 70 scatters not only the light emitted from the liquid crystal display unit 65 but also externally entering light. Therefore, the contrast of the display unit is significantly lowered, and this lowers the operation efficiency of a user. In addition, since light of the image to be displayed is scattered, for example, when a character is displayed, the character becomes blurred or thicker more than the actual image. This use of the light diffusion layer lowers the display quality.

SUMMARY OF THE INVENTION

An object of the present invention is to provide an input and output device which can reduce the depth feel of an image and realizes high display quality at low costs, and a terminal device including the input and output device.

The input and output device according to the present invention comprises: a display unit including pixel groups composed of a plurality of pixels aligned in a matrix; an optical member which turns light outgoing from a first pixel among the pixels belonging to each of the pixel groups toward a first direction and turns light outgoing from a second pixel among the pixels belonging to each of the pixel groups toward a second direction, and a locus of a first light outgoing from the first pixel and a locus of a second light outgoing from the second pixel which are driven by the same signal intersect with each other; and a flat input unit which is disposed in front of the display unit and transmits light outgoing from the display unit and detects the coordinates of a contact point when it is contacted from the front side.

In the invention, since the loci of light outgoing from the first and second pixels driven based on the identical signal intersect with each other, light outgoing from the first pixel is made to reach the right eye of a user, and the light outgoing from the second pixel is made to reach the left eye of the user, whereby the user is made to recognize the light outgoing from the first and second pixels as light outgoing from the intersection so as to recognize the image displayed by the display unit as being displayed on a virtual plane composed of a set of intersections. Thereby, the depth feel of the image can be reduced. In the invention, since no special parts are used, the costs are low, and the display quality is high since light is not diffused, and it is not necessary to form an image on a screen or the like.

It is preferable that the locus of the first light and the locus of the second light intersect with each other on the front face of the flat input unit. Thereby, the above-mentioned virtual display surface can be matched with the front face of the flat input unit, whereby the depth feel is eliminated.

In the case of arrangement in which light outgoing from the first pixel reaches the right eye of the user and light outgoing from the second pixel reaches the left eye of the user, when the interval between the eyes of the user is defined as W, the aligning pitch of the pixels in the direction of distributing light by the optical member is defined as P, the distance from the display surface of the display unit to the front face of the flat input unit is defined as T, the distance from the front face of the flat input unit to the eyes of the user is defined as L, and an integer equal to or more zero are defined as n, it is preferable that the formula (W:L=P×(2n+1):T) is satisfied. Thereby, the above-mentioned virtual display surface can be matched with the front face of the flat input unit, whereby the depth feel can be eliminated.

Furthermore, the optical member may be a lenticular lens. Thereby, the optical member can be formed by a simple lens system, and this reduces the costs.

Another input and output device of the present invention comprises: a light source for alternately emitting light in a first direction and a second direction; a liquid crystal panel that is disposed in front of the light source and includes a plurality of pixels; and a flat input unit that is disposed in front of the liquid crystal panel and transmits light outgoing from the liquid crystal panel and detects the coordinates of a contact position when it is contacted from the front side. When the light source emits light in the first direction, a first pixel of the liquid crystal panel which is driven by one signal transmits a light ray passing through a point of the front face of the flat input unit, and when the light source emits light in the second direction, a second pixel of the liquid crystal panel which is driven by the same signal as the one signal transmits a light ray passing through the point of the front face of the flat input unit.

In the invention, the first and second pixels can be driven by a time division system. Thereby, an optical member for distributing the light becomes unnecessary.

The terminal device according to the present invention has the input and output device.

The terminal device according to the present invention may be a cell phone, a PDA, a mobile terminal, a game machine, a digital camera, or a digital video camera.

According to the invention, since the loci of light outgoing from the first and second pixels driven based on the identical signal intersect with each other, a user can be made to recognize a virtual display surface on a plane positioned ahead of the actual display surface of the display unit, whereby the depth feel of the image can be reduced. In addition, the input and output device of the invention does not need special parts, so that costs are low, and the display quality is high since light is not diffused.

DETAILED DESCRIPTION OF THE PREFERRED EMBODIMENTS

Figure 1:
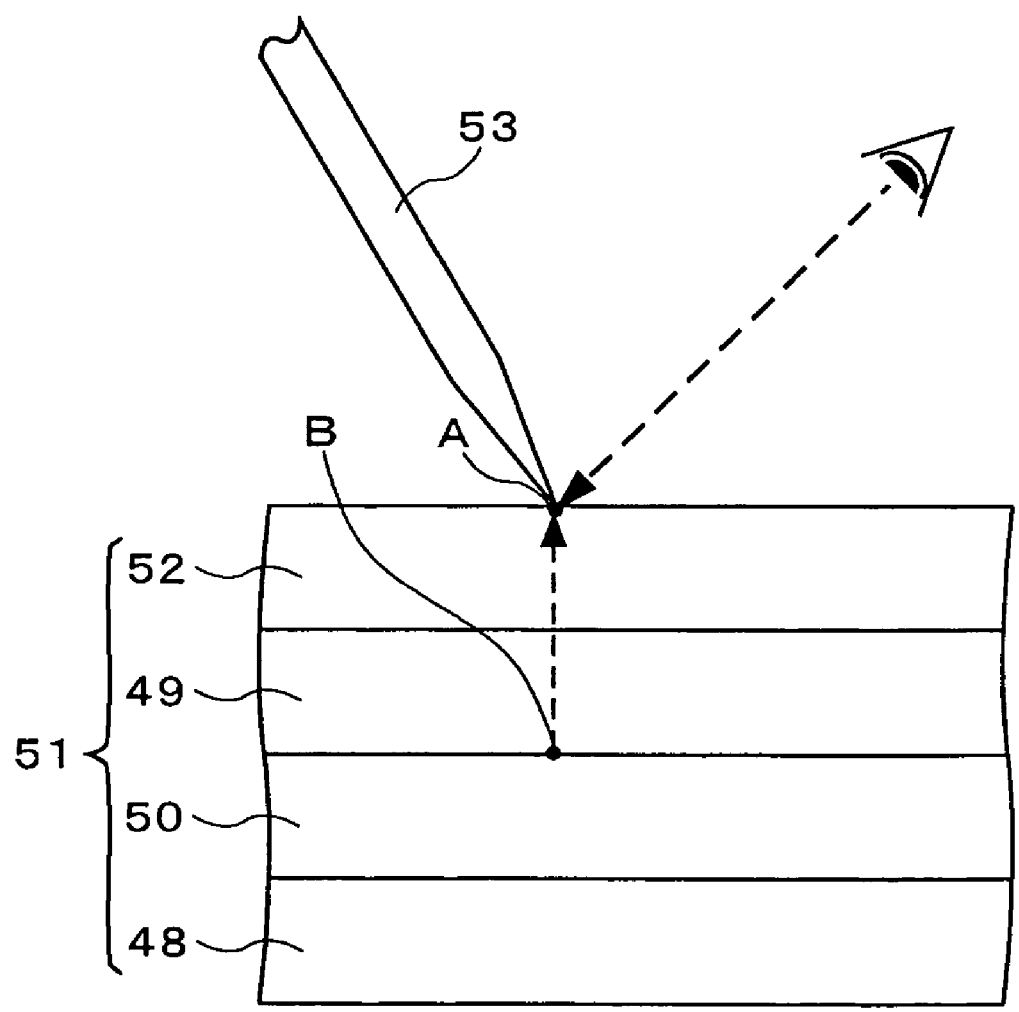
FIG. 1 is a sectional view showing a conventional input and output device.
Figure 2:
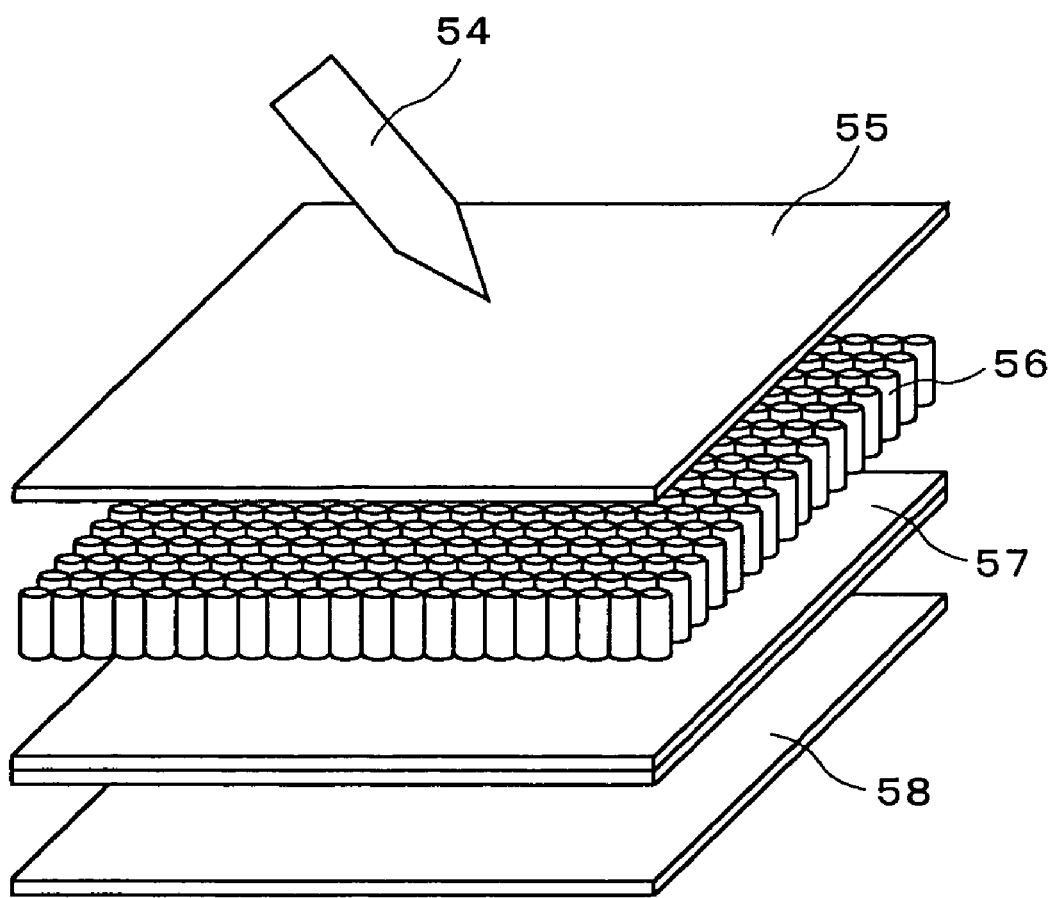
FIG. 2 is a perspective view showing a conventional input and output device disclosed in Japanese Patent Publication No. H4-114224.
Figure 3:
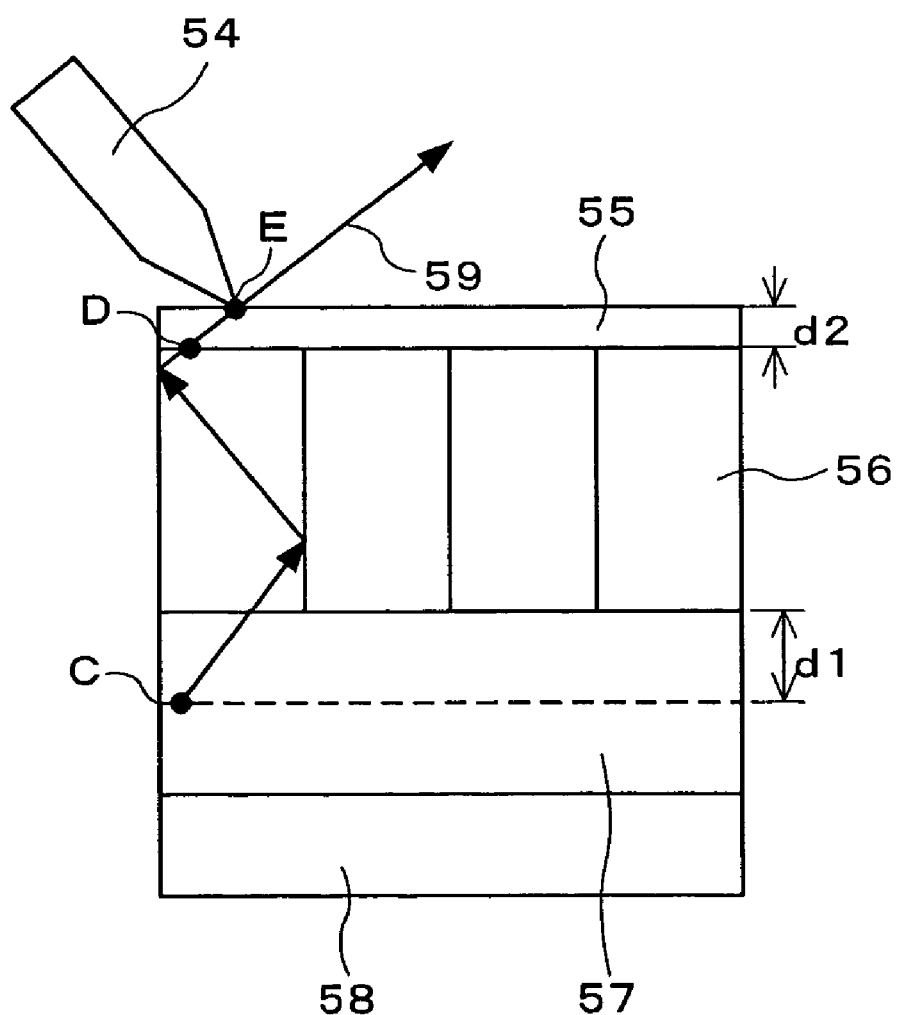
FIG. 3 is a schematic sectional view showing the input and output device shown in FIG. 2.
Figure 4:
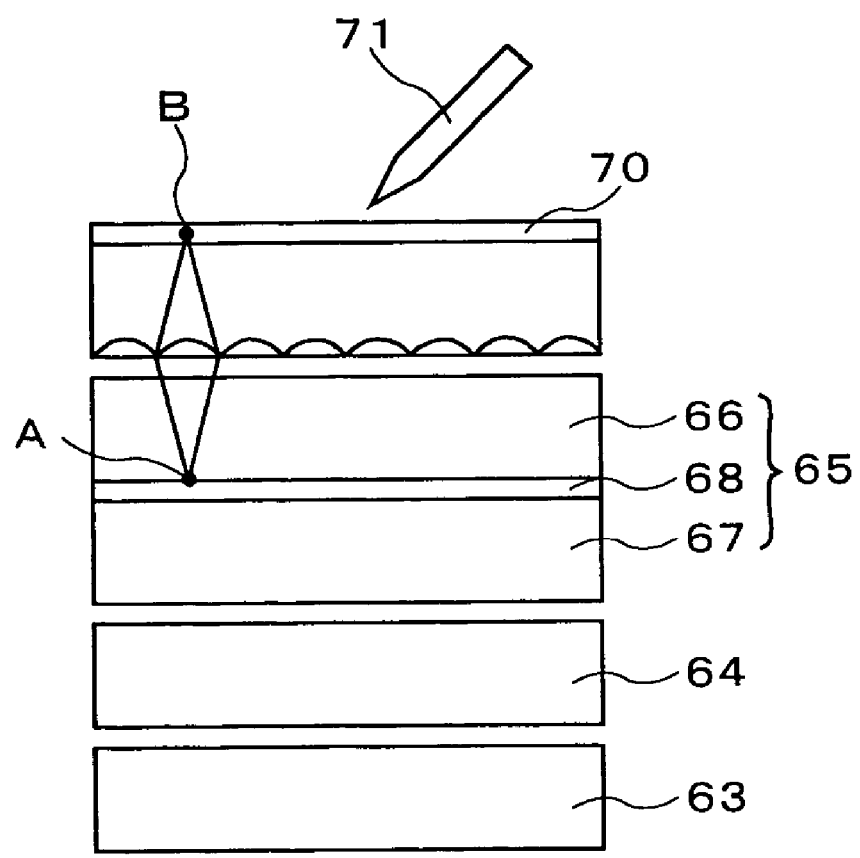
FIG. 4 is a schematic sectional view showing a conventional input and output device disclosed in Japanese Patent Publication No. H10-283114.
Figure 5:
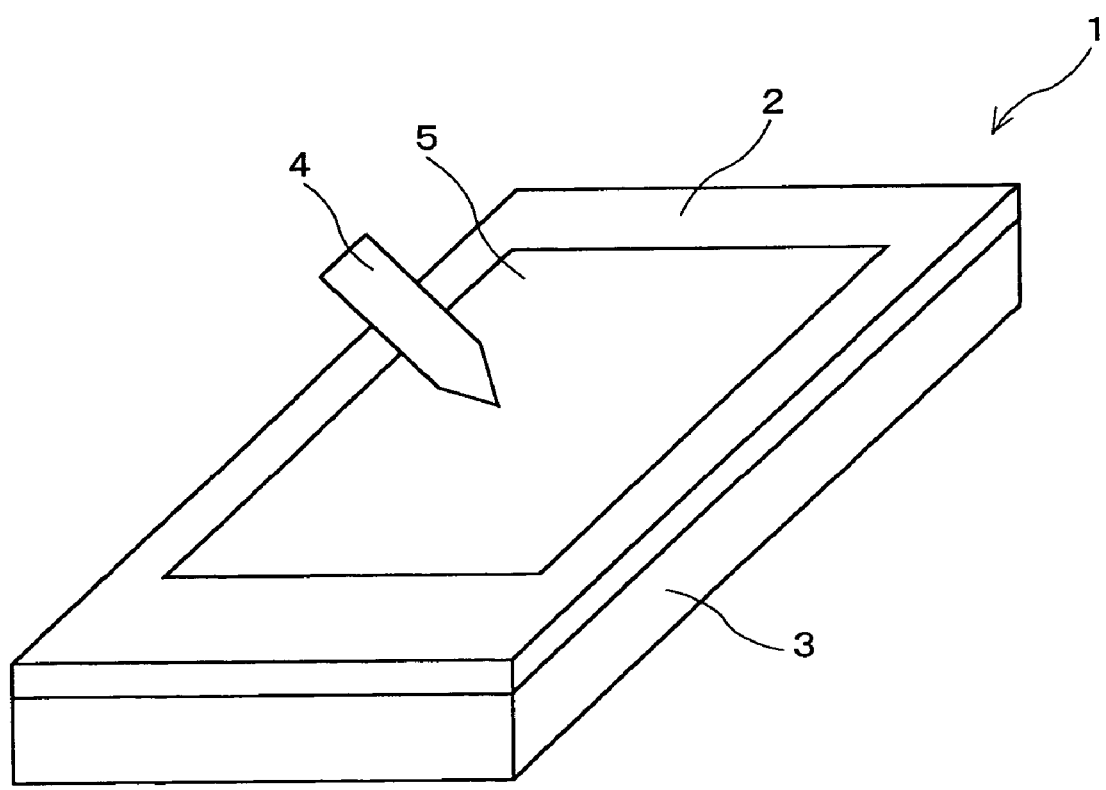
FIG. 5 is a perspective view showing an input and output device according to a first embodiment of the present invention.
Figure 6:
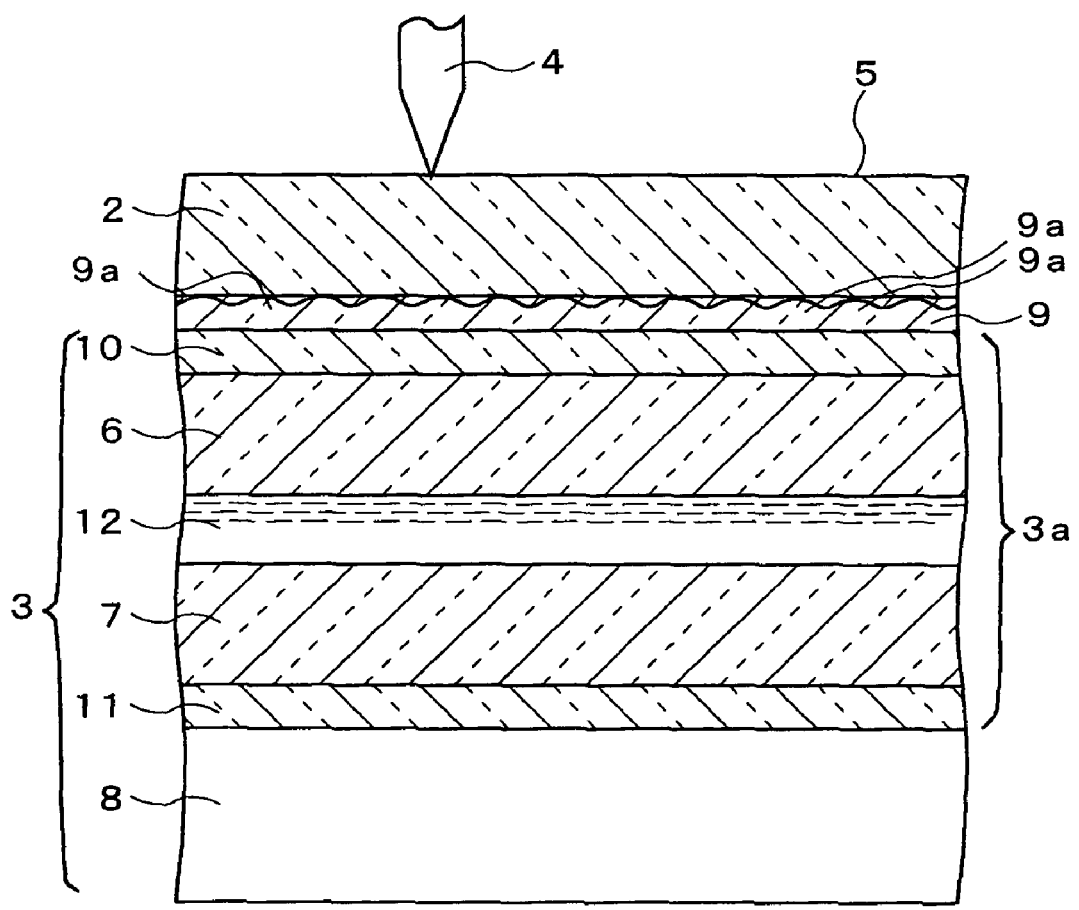
FIG. 6 is a partial sectional view showing the input and output device shown in FIG. 5.
Figure 7:
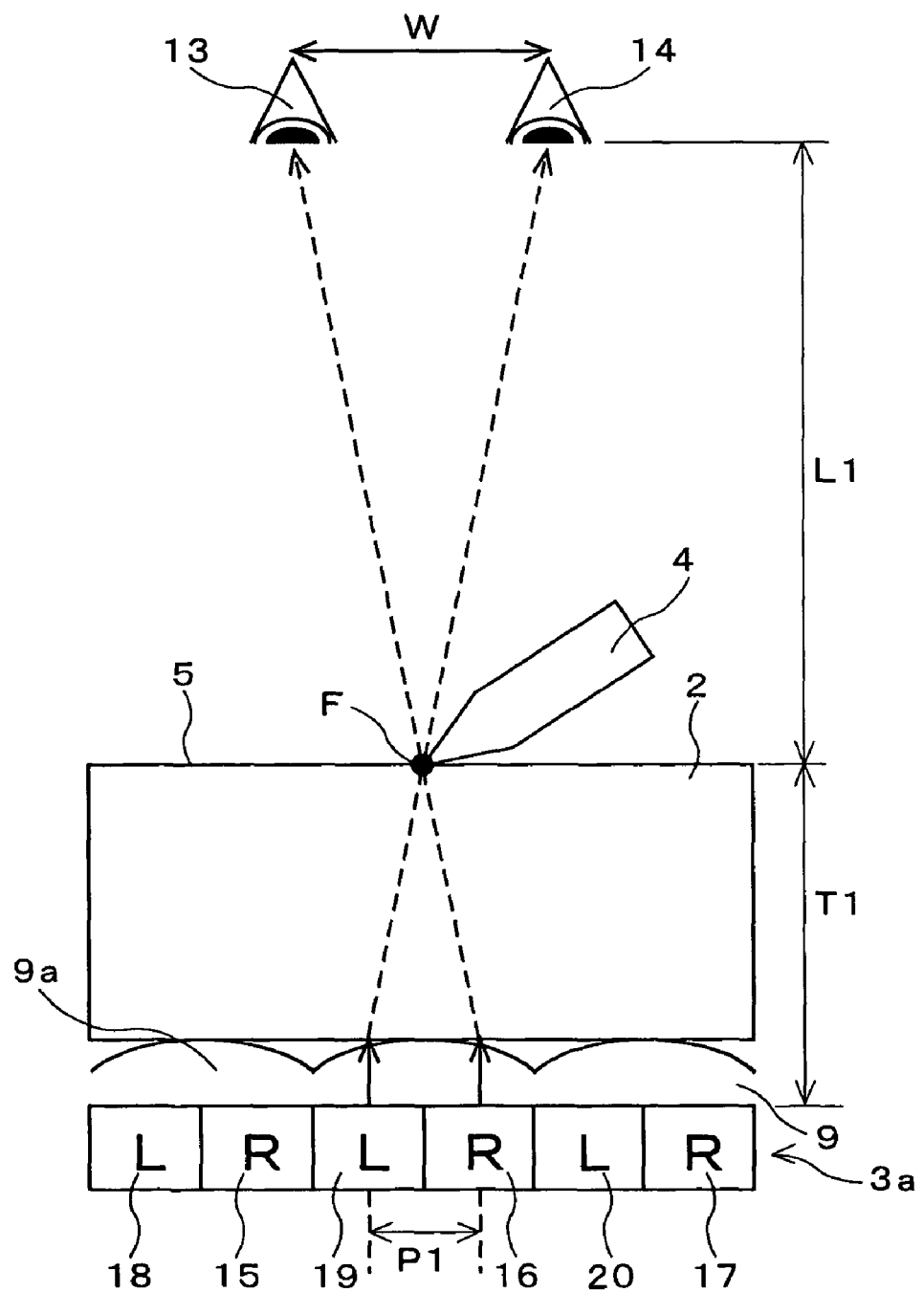
FIG. 7 is a diagram showing the optical construction of the input and output device shown in FIG. 5.

Hereinafter, embodiments of the present invention are described in detail with reference to the accompanying drawings. First, a first embodiment of the invention is described. FIG. 5 is a perspective view showing an input and output device of this embodiment, FIG. 6 is a partial sectional view of the identical, and FIG. 7 is a diagram showing the optical construction thereof. The input and output device of this embodiment is an input and output device mounted in a PDA.

As shown in FIG. 5, in the input and output device 1 of this embodiment, a liquid crystal display unit 3 as an output unit is provided, and a tablet 2 as an input unit is provided in front of this liquid crystal display unit 3. In front of the tablet 2, an input/output region 5 is provided. In response to pressing of the input/output region 5 with a pen 4 as an input means by a user, data is inputted into the tablet 2. The entirety of the tablet 2 transmits light, and the user can view an image displayed by the liquid crystal display unit 3 in the region 5. In addition, a control unit (not shown) which receives an input of data from the tablet 2, processes the inputted data, and outputs it to the liquid crystal display unit 3 is provided.

In addition, as shown in FIG. 6, in the liquid crystal display unit 3, a back light 8 is provided, and in front of the back light 8, a liquid crystal panel 3a is provided. In the liquid crystal panel 3a, a TFT substrate 7 as a back face substrate, a color filter substrate 6 as a front face substrate disposed opposite the TFT substrate 7 in front of the TFT substrate 7, and a liquid crystal layer 12 disposed between the TFT substrate 7 and the color filter substrate 6 are provided, and on the front face of the color filter substrate 6 and the back face of the TFT substrate 7, polarizing films 10 and 11 are affixed, respectively. Between the liquid crystal display unit 3 and the tablet 2, a lens 9 is provided which distributes a light ray outgoing from the liquid crystal display unit 3 into a plurality of directions. The lens 9 is a lenticular lens including, for example, a plurality of cylindrical lenses 9a aligned in parallel to each other.

Furthermore, as shown in FIG. 7, in the liquid crystal panel 3a, a plurality of pixels are provided. In FIG. 7, for convenience, only six pixels 15 through 20 are shown, however, in actuality, more pixels are provided in the liquid crystal panel 3a. In FIG. 7, the color filter substrate 6, the TFT substrate 7, the polarizing sheets 10 and 11, and the back light 8 are omitted. Each cylindrical lens 9a of the lens 9 corresponds to pixels in two rows aligned in the longitudinal direction of the cylindrical lens 9a. For example, one cylindrical lens 9a corresponds to two pixels 16 and 19 adjacent to each other. Light rays outgoing from the pixels 16 and 19 are refracted and converged by this cylindrical lens 9a, intersect with each other at the point F positioned on the surface of the tablet 2, and then reach the right eye 13 and the left eye 14 of a user, respectively.

Therefore, when the interval between the eyes of the user is defined as W, the aligning pitch of the pixels in the aligning direction of the cylindrical lenses 9a is defined as P1, the distance from the interface between the liquid crystal layer 12 (see FIG. 6) and the color filter substrate 6 (see FIG. 6) in the liquid crystal panel 3a to the front face of the tablet 2 is defined as T1, and the distance between the front face of the tablet 2 and the right eye 13 and the left eye 14 of the user is defined as L1, the following formula 1 is satisfied.

$$W1:L1=P1:T1 \qquad \text{(Formula 1)}$$

Next, operations of the input and output device of this embodiment constructed as mentioned above are described. When a user makes the tip end of the pen 4 contact with the input/output region 5 of the tablet 2, the tablet 2 detects the position of the tip end of the pen 4 as coordinate data on a two dimensional plane, and outputs this coordinate data to the control unit (not shown). The control unit processes and stores this coordinate data and then outputs this to the liquid crystal display unit 3. Then, the liquid crystal display unit 3 displays a predetermined mark (for example, black point) in real time at coordinates on the liquid crystal panel 3a corresponding to the coordinates of the tip end of the pen 4 based on the coordinate data. In this case, the control unit successively stores the coordinate data inputted in the tablet 2, whereby figures such as lines can be inputted and displayed on the liquid crystal display unit 3.

In this case, the liquid crystal display unit 3 makes a pixel group composed of a plurality of pixels at the relatively identical position as each cylindrical lens 9a of the lens 9 to display one image, and also makes another pixel group at an another position relative to each cylindrical lens 9a to display the image. Namely, the pixel group composed of the pixels 15, 16, and 17 is made to display an image, and another pixel group composed of the pixels 18, 19, and 20 is also made to display the image. Therefore, a pair of pixels corresponding to one cylindrical lens 9a of the lens 9, for example, the pixels 16 and 19 are driven by the identical signal, the pixels 15 and 18 are driven by another identical signal, and the pixels 17 and 20 are driven by still another identical signal.

In this state, the back light 8 emits light, and this light is transmitted through the pixels of the liquid crystal panel 3a and enters the lens 9. At this point, light rays transmitted through, for example, pixels 16 and 19 are refracted and converged by one cylindrical lens 9a of the lens 9 and intersect with each other at the point F positioned on the front face of the tablet 2, and the light transmitted through the pixel 16 reaches the right eye 13 of the user, and the light transmitted through the pixel 19 reaches the left eye 14 of the user. Likewise, light rays transmitted through the pixels 15 and 18 intersect with each other at another point (not shown) positioned on the front face of the tablet 2 and reach the right eye 13 and the left eye 14, respectively. Light rays transmitted through the pixels 17 and 20 intersect with each other at still another point (not shown) positioned on the front face of the tablet 2 and reach the right eye 13 and the left eye 14, respectively. Namely, the pixels 15, 16, and 17 display an image for the right eye, and the pixels 18, 19, and 20 display an image for the left eye. The image for the right eye and the image for the left eye are identical to each other, however, their display position on the liquid crystal panel 3a deviate a distance of one pixel from each other.

Thereby, a user views the image for the right eye displayed by the pixels 15, 16, and 17 with the right eye 13, and views the image for the left eye displayed by the pixels 18, 19, and 20 with the left eye 14, however, for the user, the light transmitted through the pixel 16 and the light transmitted through the pixel 19 appear to have exited from the identical point F (not shown) positioned on the front face of the tablet 2. Likewise, the light transmitted through the pixel 15 and the light transmitted through the pixel 18 also appear to have exited from another identical point (not shown) positioned on the front face of the tablet 2, and the light transmitted through the pixel 17 and light transmitted through the pixel 20 also appear to have exited from still another identical point (not sown) positioned on the front face of the tablet 2. The identical applies to other pixel pairs that are not shown in FIG. 7. As a result, for the user, the image appears to be displayed on the front face of the tablet 2.

It is allowed that the background of the input/output region 5 is set to be plain (for example, white entirely), and only data inputted by a user with the pen 4 is displayed, or some image is displayed in advance, and a user writes over this image while viewing it.

Next, the effects of the invention are described. As described above, in this embodiment, an image for the right eye is displayed by one pixel group and supplied to the right eye of a user, and an image for the left eye is displayed by another pixel group and supplied to the left eye of the user. Then, a light ray for displaying each point of the image for the right eye and a light ray for displaying each point of the image for the left eye intersect with each other. Thereby, for the user, two light rays for displaying points corresponding to each other on the image for the right eye and the image for the left eye appear to have exited from the intersection, and a user recognizes a plane formed of a set of the intersections as a virtual display surface. Then, this virtual display surface is matched with the surface of the input and output device, whereby the depth feel of the image can be eliminated. Thereby, input operations by the user are made easy and the input accuracy and efficiency are improved. The input and output device of this embodiment does not need to use expensive parts such as optical fibers, so that costs are low. Furthermore, it is not necessary to form an image on a screen or the like, so that light is not diffused and display quality is not lowered.

In FIG. 7, paths of light transmitted through the pixels are shown by lines, however, in an actual display unit, each pixel has a fixed definite area, and light emitted therefrom is also outputted in various directions. Therefore, the position to be supplied with the image for the right eye and the position to be supplied with the image for the left eye in front of the input and output device 1 do not exist on one line each, but exist as a spatial region having a fixed angle of view each. Therefore, when a user positions his/her right eye 13 and left eye 14 in the respective spatial regions, he/she can recognize the virtual display surface. Therefore, the viewpoint for eliminating the depth feel is not the one point of FIG. 7.

Figure 8:
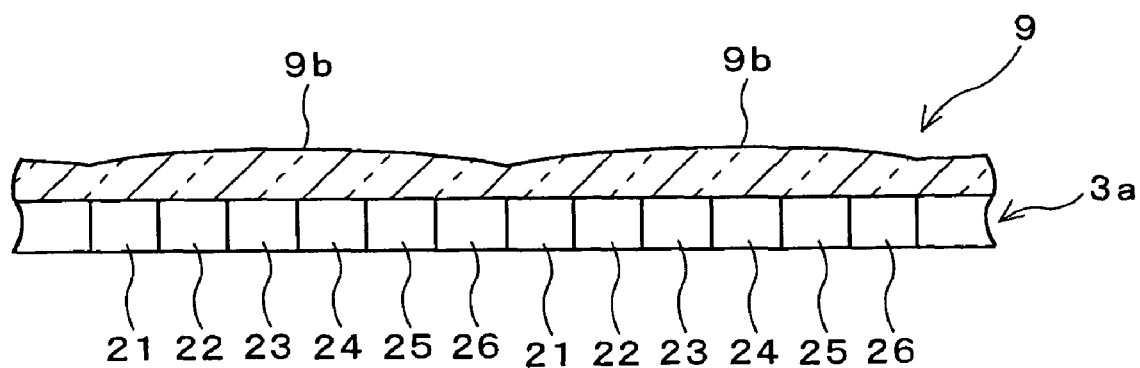
FIG. 8 is a drawing showing pixels and lenses of an input and output device according to a modified example of the first embodiment.

Next, a modified example of this first embodiment is described. FIG. 8 shows pixels and a lens of an input and output device of this modified example. As shown in FIG. 8, in the modified example, six pixels 21 through 26 correspond to one cylindrical lens 9b of the lens 9. Light rays transmitted through the pixels 21 through 26 are refracted and converged by the lenticular lens 9b, and intersect with each other at one point, and then outgo in different directions. Thereby, multi-viewpoint display is realized. The image for the right eye is displayed by one pixel of the pixels 21 through 26, and the image for the left eye is displayed by another one pixel, whereby the identical effects as in the first embodiment are obtained. In addition, for example, the pixels 21, 23, and 25 display an identical image for the left eye and the pixels 22, 24, and 26 display an identical image for the right eye, whereby a user can extend the position at which he/she can recognize the virtual display surface. The construction, workings, and effects of this modified example other than these are the identical as those of the first embodiment.

Figure 9:
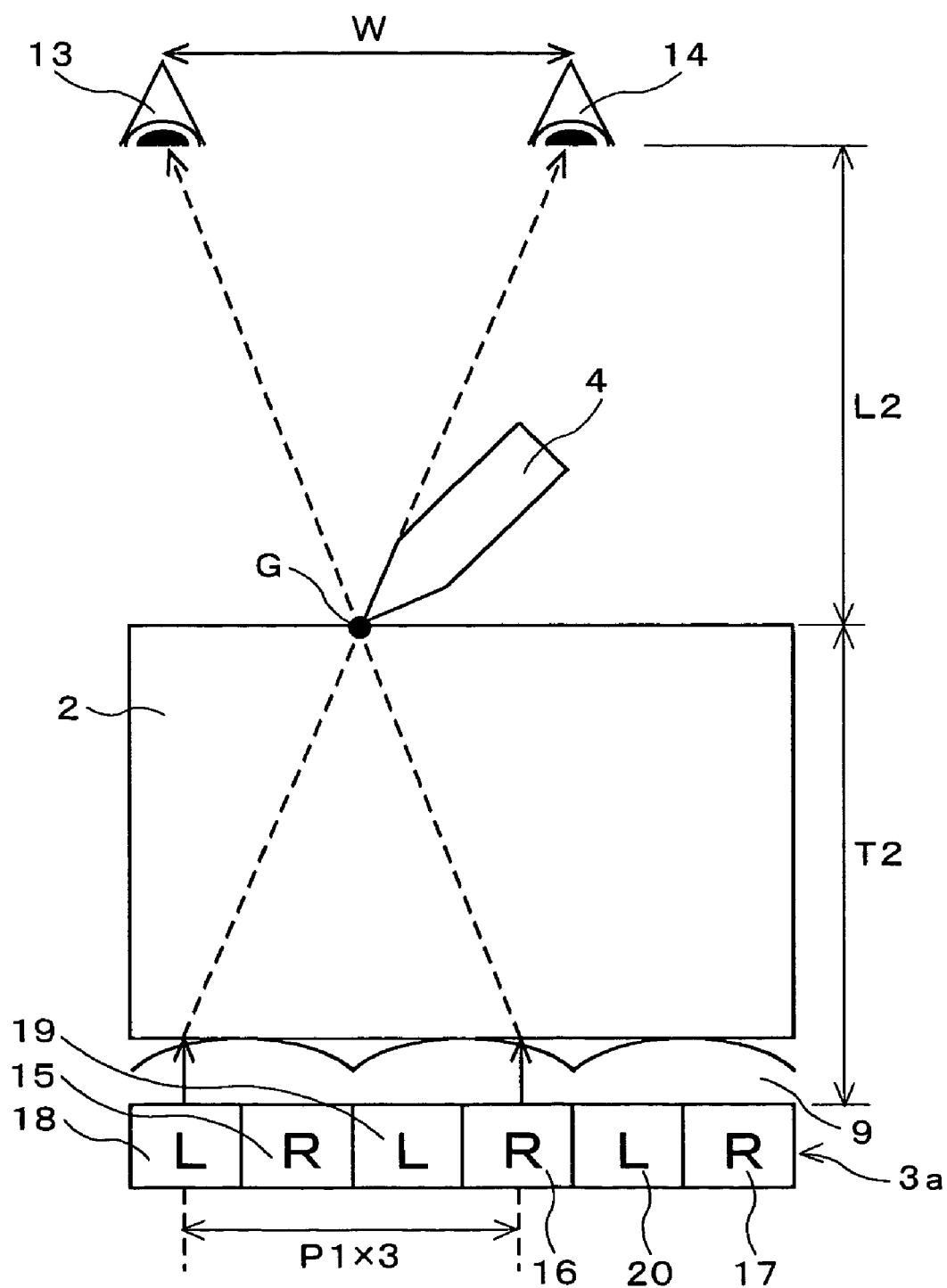
FIG. 9 is a diagram showing an optical construction of an input and output device according to a second embodiment of the present invention.

Next, a second embodiment of the invention is described. FIG. 9 shows the optical construction of an input and output device of this embodiment. As shown in FIG. 9, in this embodiment, the dimensions of the parts are different from those of the first embodiment. Namely, when the interval between the eyes of a user is defined as W, the aligning pitch of the pixels in the direction of aligning the cylindrical lenses 9a is defined as P1, the distance from the interface between the liquid crystal layer 12 (see FIG. 6) and the color filter substrate 6 (see FIG. 6) of the liquid crystal panel 3a to the front face of the tablet 2 is defined as T1, and the distance between the front face of the tablet 2 and the right eye 13 and left eye 14 of the user is defined as L2, the following formula 2 is approximately satisfied. The construction of this embodiment other than these is the identical as that of the first embodiment.

$$W:L2=P1\times 3:T2 \quad \text{(Formula 2)}$$

Next, workings of this embodiment are described. In this embodiment, in the liquid crystal panel 3a, a pair of pixels positioned apart from each other via two pixels along the direction of aligning the cylindrical lenses 9a display identical images for the right eye and for the left eye, respectively. For example, the pixel 16 shown in FIG. 9 displays the image for the right eye, and the pixel 18 displays the image for the left eye corresponding to this image for the right eye. Namely, the pixels 16 and 18 are driven by an identical signal. Then, a light ray transmitted through the pixel 16 and a light ray transmitted through the pixel 18 enter the cylindrical lenses 9a adjacent to each other, and are refracted by these cylindrical lenses 9a, intersect with each other at the point G positioned on the front face of the tablet 2, and the light transmitted through the pixel 16 reaches the right eye 13 of the user and the light transmitted through the pixel 18 reaches the left eye 14 of the user. Likewise, when the pixels 17 and 19 display an image for the right eye and an image for the left eye corresponding to each other, the light rays transmitted through the pixels 17 and 19 are refracted by two cylindrical lenses 9a adjacent to each other, intersect with each other at another point (not shown) on the front face of the tablet 2, and reaches the right eye 13 and the left eye 14, respectively. Workings other than these in this embodiment are the identical as those of the first embodiment.

Next, effects of this embodiment are described. As described above, a pair of pixels 16 and 18 apart from each other via two pixels display an image for the right eye and an image for the left eye corresponding to each other, and two light rays transmitted through these two pixels intersect with each other at the point G positioned on the front face of the tablet 2, and reach the right eye 13 and the left eye 14 of the user, respectively, whereby for the user, the two light rays appear to have exited from the point G. Therefore, the user can recognize a virtual display surface on the front face of the tablet 2, whereby the depth feel of the image can be eliminated. In this embodiment, the thickness of the tablet 2 can be increased more than in the first embodiment. Other effects of this embodiment are the identical as those of the first embodiment.

Figure 10:
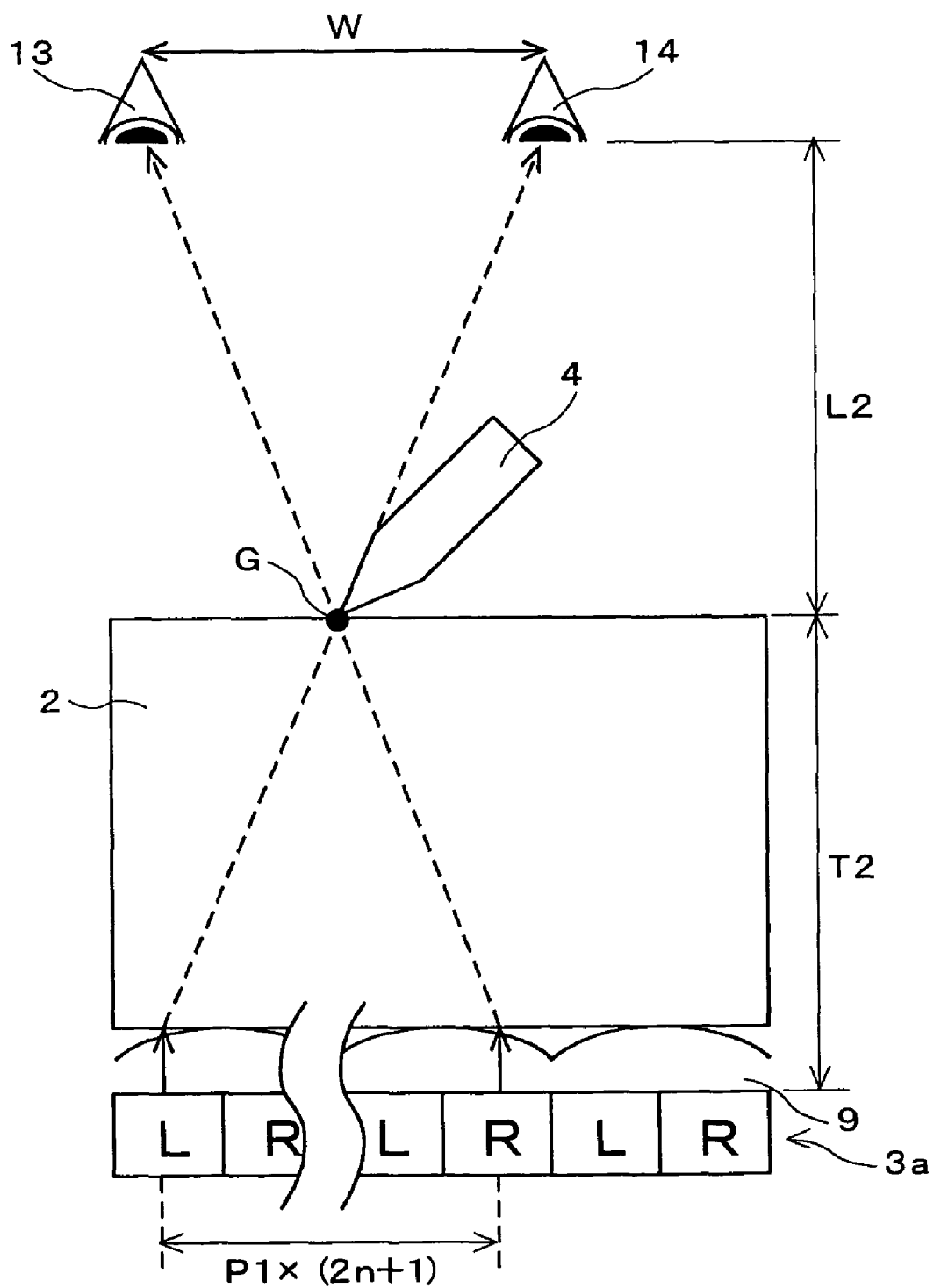
FIG. 10 is a diagram generally showing the optical construction of the input and output device according to the embodiment.

In the first embodiment, left and right images corresponding to each other are displayed by a pair of pixels adjacent to each other, and in the second embodiment, left and right images corresponding to each other are displayed by a pair of pixels disposed via two pixels therebetween, however, the positional relationship of the pair of pixels for displaying the left and right images corresponding to each other is not limited to the examples of the first and second embodiments. FIG. 10 generally shows the optical construction of an input and output device of this embodiment. As shown in FIG. 10, the relationship between the positional relationship of the pair of pixels and the dimensions of the parts in the input and output device are generally expressed as follows. Namely, when the number of pixels to be sandwiched by the pair of pixels is defined as 2n (n is an integer of 0 or more), the following formula 3 is approximately satisfied. The first embodiment is in the case where n equals zero in the following formula 3, and the second embodiment is in the case where n equals 1.

$$W:L2=P1\times(2n+1):T2 \qquad \text{(Formula 3)}$$

As shown in the formula 3, an input and output device can be provided which reduces the depth feel even when the surfaces of the liquid crystal panel and the tablet 2 are changed, that is, the distance to the position in contact with the tip of the pen is changed. The reason for this is that the pixel for displaying the image for the right eye and the pixel for displaying the image for the left eye can be selected by selecting the value of n, and thereby, the distance between the point G and the liquid crystal panel 3a can be adjusted by the distance between the two selected pixels.

Figure 11:
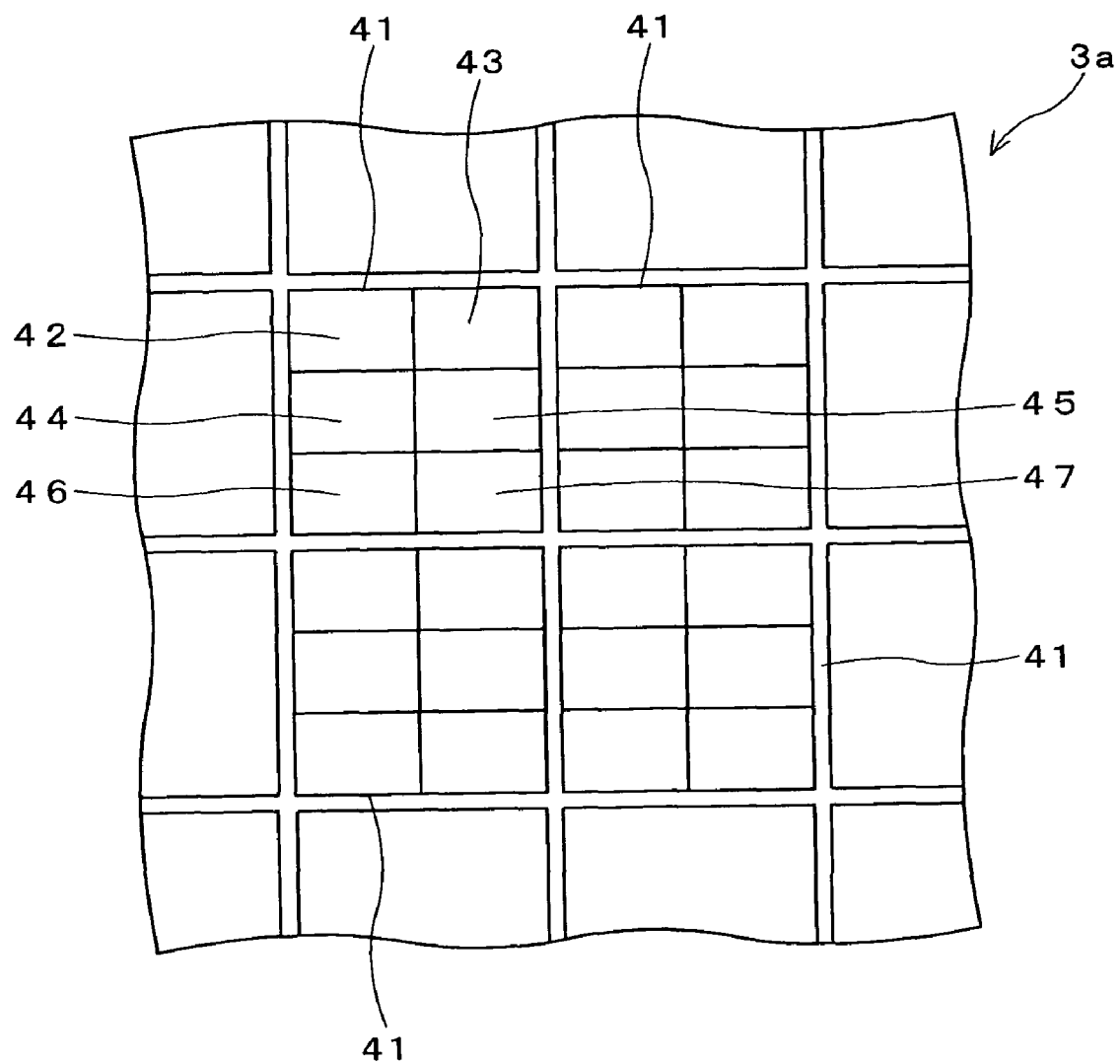
FIG. 11 is a plan view showing a liquid crystal panel in a third embodiment of the present invention.
Figure 12:
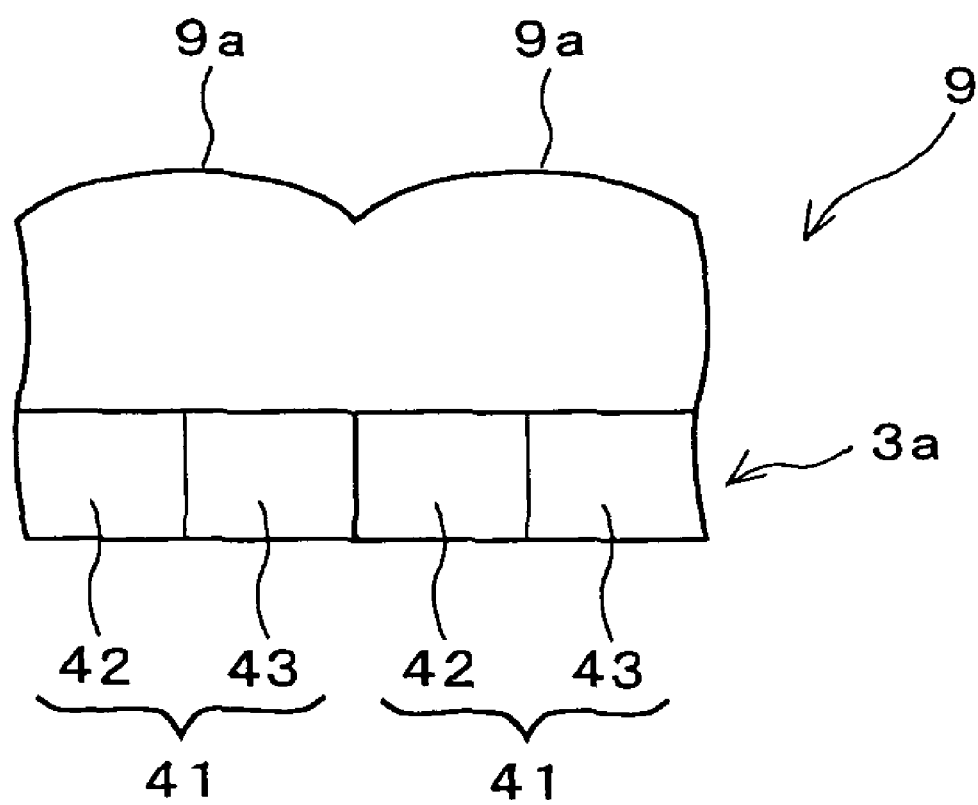
FIG. 12 is a view showing pixels and lenses of the input and output device of the embodiment.

Next, a third embodiment of the invention is described. FIG. 11 is a plan view showing a liquid crystal panel 3a of this embodiment, and FIG. 12 shows pixels and a lens of an input and output device of this embodiment. The input and output device of this embodiment is installed in a cell phone. In the input and output device of this embodiment, the positional relationship between the tablet 2 and the liquid crystal display unit 3 and the positional relationship of the components in the liquid crystal display unit 3 are the identical as those of the input and output device of the first embodiment shown in FIG. 5 and FIG. 6. Hereinafter, the construction of this embodiment is described with reference to FIG. 5 and FIG. 6.

In this embodiment, the liquid crystal panel 3a of the liquid crystal display unit 3 has a diagonal screen size of 4 inches, and has a pixel number of 480 pixels (picture elements) vertically and 320 pixels horizontally. The tablet 2 is a resist film tablet using ITO for transparent electrodes. The input and output device of this embodiment is used in a mobile terminal. Furthermore, the back light 8 is a back light using light emitting diodes. The TFT substrate 7 applies a signal voltage for controlling the orientation of the liquid crystal layer 12 to the liquid crystal layer 12. The lens 9 is a lenticular lens made of an acrylic resin, and the height of each cylindrical lens 9a is, for example, 10 micrometers. The distance from the interface between the liquid crystal layer 12 and the color filter substrate 6 to the front face of the tablet 2, that is, the distance to the surface on the side to be contacted with the pen 4 is, for example, 1.6 mm.

In addition, as shown in FIG. 11, in the liquid crystal panel 3a, a plurality of picture elements (pixels) 41 are aligned in a matrix. In each picture element 41, six pixels 42 through 47 are aligned in a matrix of 3 lines and 2 rows. Namely, in each picture element 41, pixels 42, 44, and 46 are aligned in a row in this order along the line direction, and the pixels 43, 45, and 47 are aligned in a row in this order along the line direction. In addition, the pixels 42 and 43, the pixels 44 and 45, and the pixels 46 and 47 are aligned along the row direction, respectively. One picture element 41 is composed of three color pixels of R, G, and B, and the pixels 42 and 43 are red (R) pixels, the pixels 44, and 45 are green (G) pixels, and the pixels 46 and 47 are blue (B) pixels. In addition, the pixels 42, 44, and 46 are pixels for the right eye for displaying an image for the right eye, and the pixels 43, 45, and 47 are pixels for the left eye for displaying an image for the left eye.

This picture element 41 composed of a set of six pixels are arranged 480 vertically and 320 horizontally to form a display part. As shown in FIG. 12, cylindrical lenses 9a of the lens 9 extend in the line direction, that is, the vertical direction of the liquid crystal panel 3a, and one cylindrical lens 9a corresponds to the row of picture elements 41 aligned in a row in the line direction. Namely, the width of one cylindrical lens 9a equals the width of the picture element 41.

Next, working of this embodiment is described with reference to FIG. 9. In this embodiment, the interval between the eyes of the user, that is, the distance W between the right eye 13 and the left eye 14 is set to 65 mm, and the distance L2 between the right eye 13 and left eye 14 and the surface of the input and output device 1 is set to 400 mm. In addition, as described above, the distance from the interface between the liquid crystal layer 12 and the color filter substrate 6 to the front face of the tablet 2 is set to 1.6 mm. When the distance between a pair of pixels for displaying an image for the right eye and an image for the left eye corresponding to each other is defined as X, the following formula 4 is satisfied from the formula 3. Namely, by determining the distance X so as to satisfy the following formula 4, display in which the depth feel is eliminated is realized.

$$65:400=X:1.6 \qquad \text{(Formula 4)}$$

From the formula 4, X=0.26 mm. Then, the diagonal screen size of the liquid crystal panel 3a is 4 inches, and the number of picture elements is 480 vertically and 320 horizontally, so that the aligning pitch of the picture elements is 177 micrometers. Therefore, as shown in FIG. 12, the aligning pitch P of the pixels is the half of the aligning pitch of the picture elements, so that P=88.5 micrometers. Therefore, the cycle number N of the pixels corresponding to the distance X is determined by the following formula 5.

$$N = X \div P = 0.26 \div 0.0885 \approx 3 \quad \text{(Formula 5)}$$

From the formula 5, in this embodiment, a pair of pixels disposed at a distance three times the aligning pitch P of the pixels from each other are made to display an image for the right eye and an image for the left eye corresponding to each other, whereby a user can be made to recognize a virtual display surface almost on the surface of the input and output device, that is, the front face of the tablet 2, and the depth feel can be almost completely eliminated. This means that, as shown in FIG. 9, the pixels 16 and 18 disposed by sandwiching two pixels therebetween are made to display an image for the right eye and an image for the left eye corresponding to each other. Other workings and effects of this embodiment are the identical as those of the second embodiment.

Figure 13:
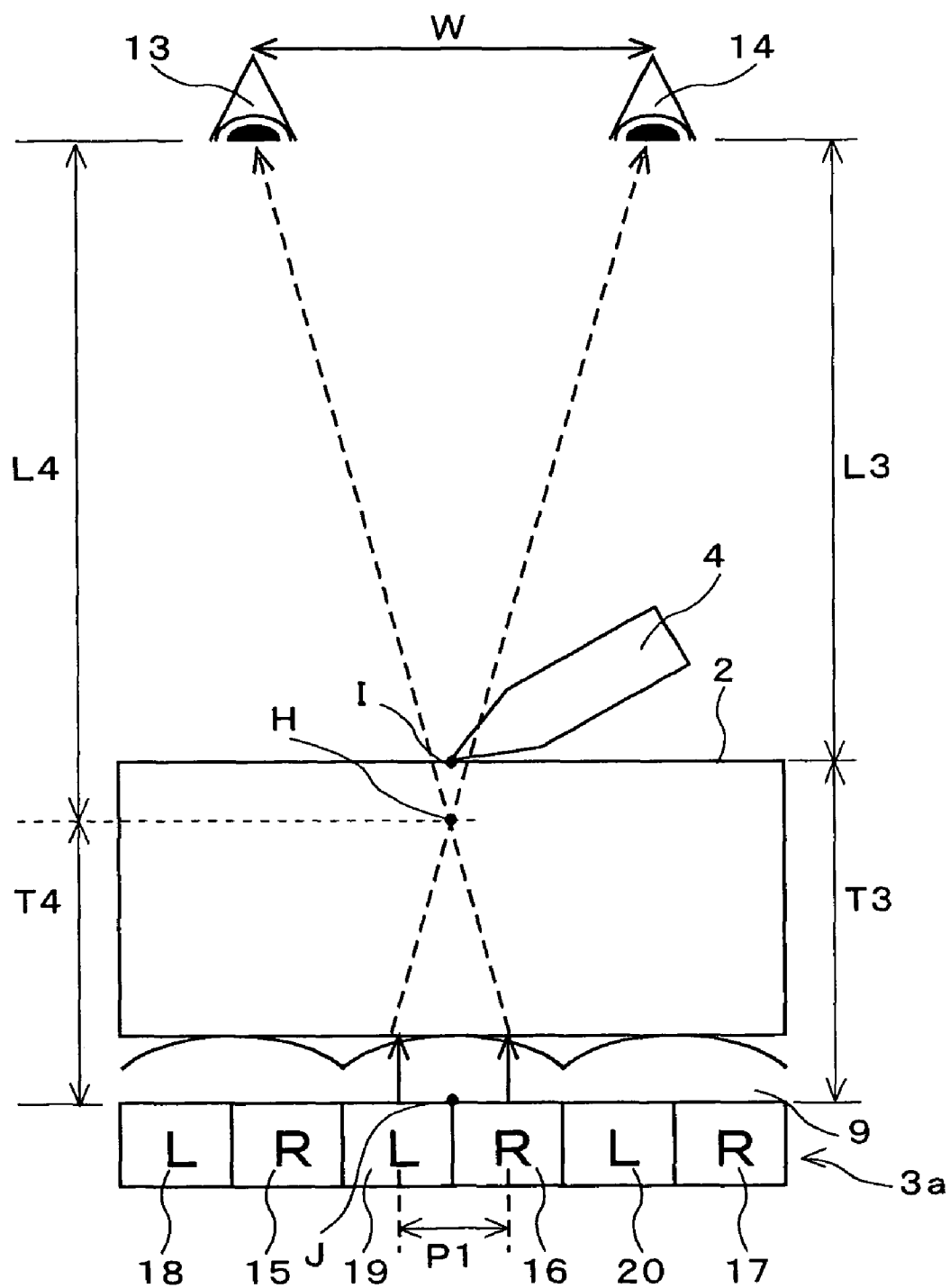
FIG. 13 is a diagram showing an optical construction of an input and output device according to a fourth embodiment of the present invention.

Next, a fourth embodiment of the invention is described. FIG. 13 shows an optical construction of an input and output device of this embodiment. This embodiment is different from the third embodiment in that a pair of pixels adjacent to each other display an image for the right eye and an image for the left eye corresponding to each other and the distance from the interface between the liquid crystal layer 12 and the color filter substrate 6 to the front face of the tablet 2 is 0.7 mm. The construction other than these is the identical as that of the third embodiment. Namely, the positional relationship between the tablet 2 and the liquid crystal display unit 3 and the positional relationship of the components of the liquid crystal display unit 3 are the identical as those of the input and output device of the first embodiment shown in FIG. 5 and FIG. 6, and the tablet 2 is a resist film tablet, the diagonal screen size of the liquid crystal panel 3a is 4 inches, and the pixel number is 480 picture elements vertically and 320 picture elements horizontally, and the alignment of the pixels 42 through 47 in each picture element 41 is as shown in FIG. 12, and the height of the cylindrical lenses 9a is 10 micrometers.

As shown in FIG. 13, the distance between the eyes of a user is set to 65 mm, the distance L3 between the right eye 13 and left eye 14 and the surface of the input and output device 1 is set to 400 mm. In addition, as described above, the distance T3 from the interface between the liquid crystal layer 12 and the color filter substrate 6 to the front face of the tablet 2 is set to 0.7 mm. Furthermore, the intersection of light rays transmitted through a pair of pixels adjacent to each other, for example, the pixels 16 and 19 shown in FIG. 13 is defined as a point H, the distance from the interface between the liquid crystal layer 12 and the color filter substrate 6 to the intersection H is defined as T4, and the distance from the intersection H to the right eye 13 and left eye 14 of the user is defined as L4. Furthermore, as in the case of the third embodiment, the aligning pitch of the picture elements 41 (see FIG. 12) is 177 micrometers, and the aligning pitch P of pixels is 88.5 micrometers. Thereby, the following formulas 6 and 7 are satisfied from FIG. 13.

$$L4 + T4 = L3 + T3 = 400 + 0.7 \quad \text{(Formula 6)}$$

$$65 : L4 = 0.0885 : T4 \quad \text{(Formula 7)}$$

The distances L4 and T4 calculated from the formulas 6 and 7 are L4≈400.155 mm and T4≈0.545 mm. The distance T3 is 0.7 mm and the distance T4 is 0.545 mm, so that the difference between T3 and T4 is 0.155 mm.

Therefore, although the distance between the display point J of the liquid crystal panel 3a and the contact point I with the pen 4 is approximately 0.7 mm in the conventional input and output device, in this embodiment, the distance between the vertical display point H and the contact point I with the pen 4 is 0.155 mm. Therefore, in comparison with the conventional input and output device, the input and output device of this embodiment can significantly reduce the depth feel. The workings and effects other than these in this embodiment are the identical as those of the third embodiment.

In the third and fourth embodiments, a resist film type is used for the tablet 2 and position detection is carried out in response to contact with the pen 4, however, the invention is not limited to this, and an electrostatic capacitory coupling tablet may be used, and the identical effects as those of the third and fourth embodiments can be obtained even by using any other type of tablet that is used by being disposed between the display unit and a user.

In the above-mentioned embodiments, the tablet 2 is disposed between the liquid crystal display unit 3 and a user, however, the invention is not limited thereto, and it is allowed that the tablet is disposed on the back face of the display unit as long as inputting is possible. For example, even when an electromagnetic induction type tablet is disposed on the back face of the liquid crystal display unit 3 and the position of the tip end of the pen is detected, the identical effects as those of the third and fourth embodiments are obtained. In this case, only the depth feel caused by the front face substrate of the liquid crystal panel is eliminated. In the liquid crystal display panel 3a, there is no special limitation on the hierarchical relationship of the color filter substrate 6 and the TFT substrate 7.

Furthermore, in the embodiments described above, the output equipment is a liquid crystal display unit, however, the invention is not limited thereto, and a display unit other than the liquid crystal display unit, for example, an organic EL display, a plasma display, etc., can be used as the output equipment.

Furthermore, in the embodiments described above, the lens 9 is a lenticular lens having a convex portion turned toward the user side, however, the invention is not limited thereto, and for example, a fry-eye lens can be used as long as it can display a virtual image on the position of the tip of the pen as described above, and the lens shape is not especially limited. In place of the lenticular lens, it is also possible that a parallax barrier is disposed between the liquid crystal panel 3a and the back light 8 so that the orientations of light outgoing from pixels are controlled to distribute light from the pixels to the image for the right eye and the image for the left eye. In addition, for example, even when the tablet 2 and the lens 9 are disposed between the polarizing film 10 and the color filter substrate 6, the identical effects as those of the embodiments are obtained.

Furthermore, it is also possible that a liquid crystal panel that responds at a high speed and a back light that distributes the outgoing light direction at a high speed are used, the image for the right eye and the image for the left eye are alternately displayed by the liquid crystal panel, and in synch with this, the back light distributes the light outgoing direction, whereby the image for the right eye is supplied to the right eye of the user when the liquid crystal panel displays the image for the right eye and the image for the left eye is supplied to the left eye of the user when the liquid crystal panel displays the image for the left eye. In this case, the loci of two light rays displaying the image for the right eye and the image for the left eye corresponding to each other are also made to intersect with each other at a point positioned on the front face of the input and output device. Thereby, the user can recognize a virtual display surface as in the case of the embodiments due to the persistence of vision of the eyes.

Moreover, in the embodiments, the input and output device is installed in a PDA or a mobile terminal, however, the invention is not limited to these, and the input and output device of each embodiment described above can be installed in a cell phone, a game machine, a digital camera, or a digital video camera. It can also be used as a terminal device of a personal computer.

What is claimed is:

1. An input and output device comprising:
   a display unit including a plurality of pixel groups aligned in a matrix, each of said pixel groups having a plurality of pixels;
   a flat input unit, a first pixel and a second pixel always displaying identical images simultaneously, said first pixel and said second pixel positioned apart from each other via a third pixel therebetween; and
   an optical lens which turns light outgoing from said first pixel among the pixels belonging to each of said pixel groups toward a first direction and turns light outgoing from said second pixel among said pixels belonging to each of said pixel groups toward a second direction, and a locus of a first light outgoing from said first pixel and a locus of a second light outgoing from said second pixel which are driven by the same signal intersect with each other on a front face of said flat input unit;
   wherein said flat input unit is disposed in front of said display unit and transmits light outgoing from said display unit and detects the coordinates of a contact point when said flat input unit is contacted from the front face.

2. The input and output device according to claim 1, wherein the display unit includes a plurality of the first pixels and a plurality of the second pixels, and a first pixel group composed of the plurality of the first pixels and a second pixel group composed of the plurality of the second pixels display a same image.

3. The input and output device according to claim 1, wherein in the case of arrangement in which light outgoing from said first pixel reaches a right eye of an user and light outgoing from said second pixel reaches a left eye of the user, and the interval between the eyes of the user is defined as W, the aligning pitch of said pixels in the direction of distributing light by said optical lens is defined as P, the distance from the display surface of said display unit to the front face of said flat input unit is defined as T, the distance from the front face of said flat input unit to the eyes of the user is defined as L, and an integer equal to or more than zero is defined as n, the following formula is satisfied:

$$W:L=P\times(2n+1):T.$$

4. The input and output device according to claim 1, wherein said display unit is a liquid crystal panel.

5. The input and output device according to claim 1, wherein said flat input unit is a tablet.

6. The input and output device according to claim 1, wherein said optical lens is a lenticular lens.

7. The input and output device according to claim 1, wherein said optical lens is a fly-eye lens.

8. The input and output device according to claim 1, wherein one picture element is composed of one of said pixel group or a plurality of said pixel groups disposed continuously, and said picture elements are disposed in a square region.

9. An input and output device according to claim 1, wherein said input and output device is included in a terminal device.

10. An input and output device according to claim 9, wherein said terminal device is a cell phone, a PDA, a mobile terminal, a game machine, a digital camera, or a digital video camera.

11. An input and output device comprising:
    a light source for alternately emitting light in a first direction and a second direction;
    a liquid crystal panel that is disposed in front of said light source and includes a plurality of pixels, a first pixel and a second pixel always displaying identical images simultaneously, said first pixel and said second pixel positioned apart from each other via a third pixel therebetween; and
    a flat input unit that is disposed in front of said liquid crystal panel and transmits light outgoing from said liquid crystal panel and detects the coordinates of a contact position when said flat input unit is contacted from a front face, when said light source emits light in said first direction through an optical lens, said first pixel of said liquid crystal panel which is driven by one signal transmits a light ray passing through a point of the front face of said flat input unit, and when said light source emits light in the second direction through said optical lens, said second pixel of said liquid crystal panel which is driven by the same signal as said one signal transmits a light ray passing through said point of the front face of said flat input unit.

12. An input and output device according to claim 9, wherein said input and output device is included in a terminal device.

13. An input and output device according to claim 12, wherein said terminal device is a cell phone, a PDA, a mobile terminal, a game machine, a digital camera, or a digital video camera.

* * * * *

UNITED STATES PATENT AND TRADEMARK OFFICE
CERTIFICATE OF CORRECTION

PATENT NO.         : 7,812,831 B2
APPLICATION NO.    : 11/154734
DATED              : October 12, 2010
INVENTOR(S)        : Naoyasu Ikeda, Shin-ichi Uehara and Nobuaki Takanashi It is certified that error appears in the above-identified patent and that said Letters Patent is hereby corrected as shown below:

Column 14, Line 42: In Claim 12, delete "claim 9," and insert -- claim 11, --.

Signed and Sealed this
Eighteenth Day of January, 2011

David J. Kappos
*Director of the United States Patent and Trademark Office*